Nov. 15, 1966     R. A. MARTEL     3,286,027
ELECTRO-LUMINESCENT PHOSPHORESCENT DYNAMIC DISPLAY
Filed Jan. 24, 1964     2 Sheets-Sheet 1
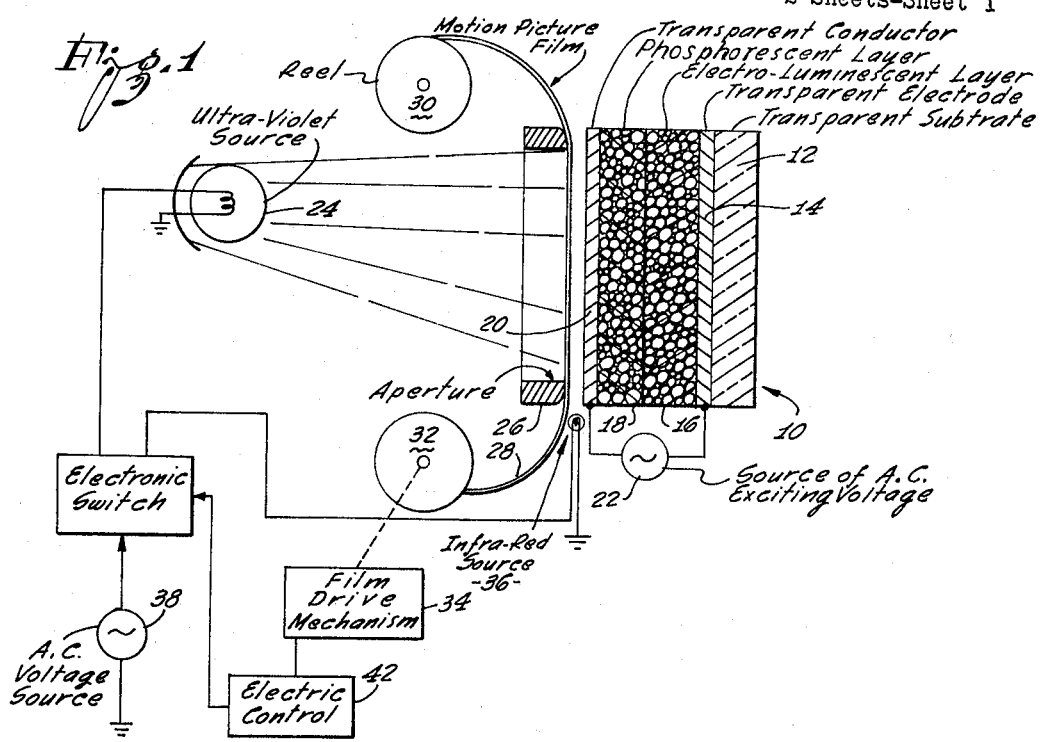
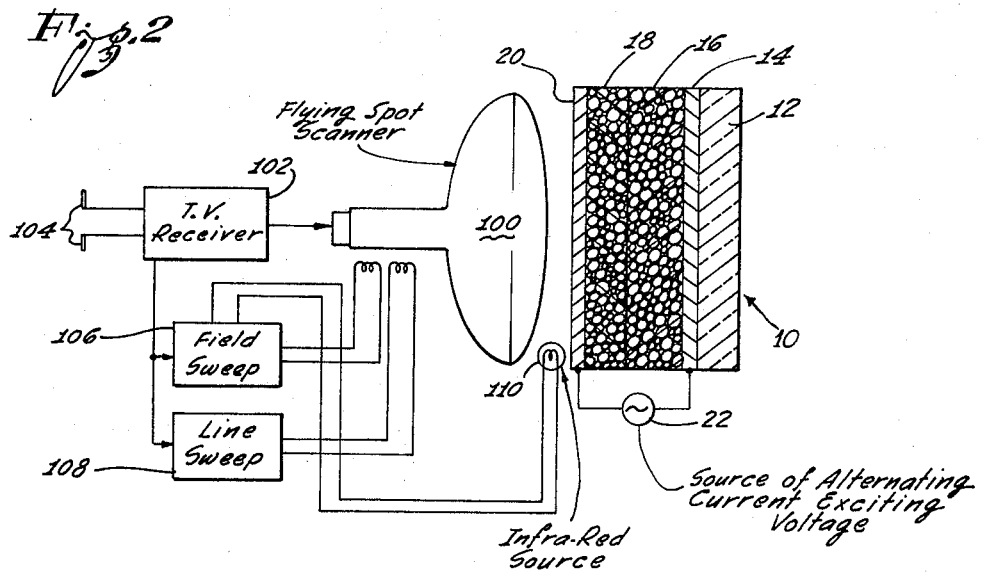
INVENTOR:
Richard A. Martel
Attorney

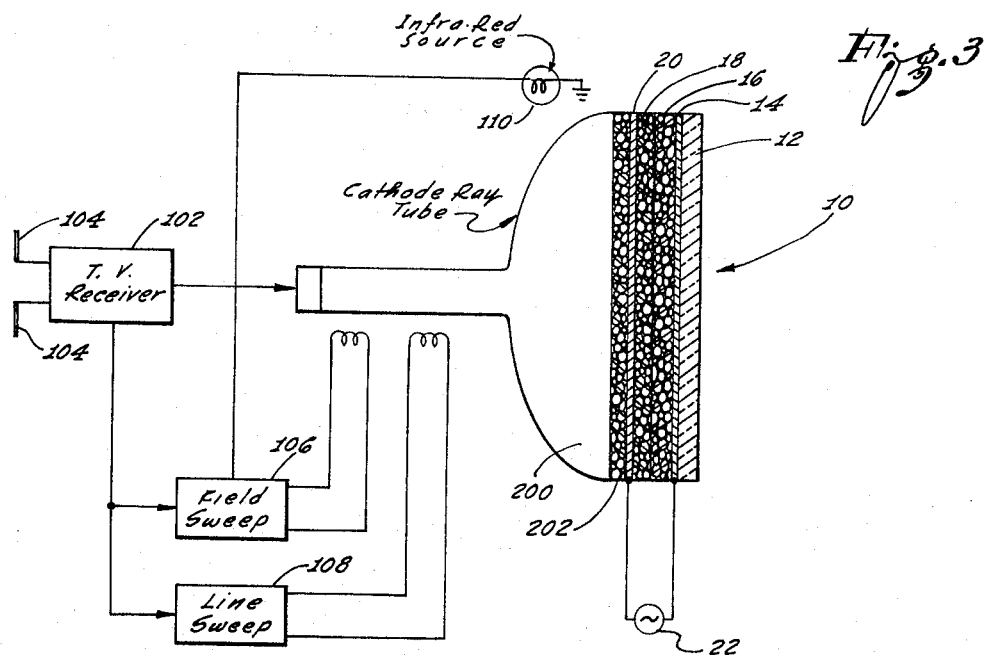

United States Patent Office 3,286,027
Patented Nov. 15, 1966

3,286,027
ELECTRO-LUMINESCENT PHOSPHORESCENT
DYNAMIC DISPLAY
Richard A. Martel, Sylmar, Calif., assignor to General
Precision, Inc., a corporation of Delaware
Filed Jan. 24, 1964, Ser. No. 339,945
10 Claims. (Cl. 178—7.5)

The present invention relates to display systems, and it relates more particularly to an improved display system for reproducing dynamic radiation images.

Copending application 330,164 discloses and claims a laminated cell construction composed of layers of phosphorescent and electro-luminescent material. The different layers in each of the cells described in the copending case are arranged in the manner of a usual parallel plate capacitor, in which layers of the different phosphorescent and electro-luminescent materials are sandwiched between parallel transparent electrode plates.

The parallel electrode plates of the cell described in the copending case are preferably composed of thin transparent films of electrically conductive material; and the phosphorescent and electro-luminescent materials are formed as two distinct layers, a first layer composed of a particular phosphorescent material and the adjacent second layer composed of a suitable electro-luminescent material.

The improved dynamic display system of the present invention utilizes a cell which may be similar to that described in the copending application, and the cell is used in accordance with the concepts of the present invention for the display of dynamic images.

The material of the first layer in the display cell to be used in the dynamic display system of the present invention may, for example, be a phosphorescent material. In fact, this material may be of any suitable material which exhibits an impedance change to an impressed alternating current voltage in the presence of incident radiations. Phosphorescent material is used in the embodiment to be described because such material is capable of being excited and of rapidly responding to ultraviolet radiation, and such material may be rapidly quenched by infrared radiations.

The electro-luminescent material of one of the layers mentioned above may be excited to luminescence by the application of an alternating current electric field. This field is applied through the adjacent layer of phosphorescent material, so that the brightness of any point on the electro-luminescence layer is proportional to the electrical impedance exhibited at that point to the alternating current electric field by the adjacent phosphorescent layer.

A typical suitable material for the electro-luminescent layer is copper activated mixture of zinc oxide and zinc sulfide. Of course, other electro-luminescent materials may also be used, a wide variety of such materials being known to the art. The operation of the display cell constructed to include a phosphorescent layer and an electro-luminescent layer is described in the copending application.

The operation of the cell described in the copending case is predicated upon the property of the phosphorescent material to exhibit an electrical impedance change upon the incidence of the exciting radiation. Therefore, when an exciting radiation image is projected onto the phosphorescent dielectric layer, the image is displayed on that layer by corresponding illuminated areas thereof. Simultaneously therewith, the electrical impedance across the phosphorescent layer is reduced from point to point in a pattern corresponding to the displayed image, and in direct proportion to the light and shade values of the displayed image.

As described in detail in the copending application, the electrical impedance pattern persists in the phosphorescent layer long after the originally illuminated image is no longer visible to the naked eye. The resulting instantaneous decrease in the electrical impedance across the phosphorescent layer, which occurs upon the incidence of the radiation representing the displayed image decays along a curve which decreases with time at a much slower rate than the decay time curve of the visible image.

When an alternating current electric potential is applied across the electrodes of the display cell described above, and when a radiation image is projected onto the phosphorescent layer, the resulting changes in the impedance across the phosphorescent layer from point to point, causes by voltage divider action the actual potential applied across corresponding points of the electro-luminescent layer to have different values. Accordingly, the electro-luminescent layer is excited, and is caused to display an amplified illuminated image corresponding to the radiation image incident on the phosphorescent layer.

Therefore, the impedance and potential patterns exhibited by the cell enable the alternating current voltage applied across the cell to cause the electro-luminescent layer to glow and display the radiation image projected onto the phosphorescent layer. It has also been found that the phosphorescent layer may be quenched and instantaneously returned to its original electrical and optical condition by the incidence of infrared radiations.

The response time of the phosphorescent layer to the exciting action of the ultraviolet radiation, and the converse response of the phosphorescent layer to the quenching action of the infrared radiation is, in each instance, extremely rapid. This property of the cell is utilized in the dynamic display system of the present invention, in which, in the embodiments to be described, sequentially interrupted outputs of respective ultraviolet and infrared sources are directed onto the phosphorescent layer of the display cell.

The above-mentioned sequential action permits movements in the radiation image produced by the ultraviolet excitation to be displayed. To "hold" any one of the successive dynamic images in a static state, it is merely necessary to cut off the ultraviolet impingement, and at the same time cut off the infrared source. The image displayed at that particular instant, may then be held in the cell and displayed in a static sense for relatively long intervals of time.

An object of the present invention, accordingly, is to provide an improved display system which is capable of faithfully reproducing dynamic radiation images of long persistence.

Another object of the invention is to provide such an improved dynamic display system, in which the action can be terminated at any time, so as to display a static image for a desired time interval.

The features of the invention which are believed to be new are set forth in the claims. The invention itself, however, together with further objects and advantages, may best be understood by reference to the following specification, when taken in conjunction with the accompanying drawings, in which:

FIGURE 1 is a schematic, sectional representation of a dynamic display system constructed in accordance with the concepts of the invention and representing one embodiment of the invention;

FIGURE 2 is a schematic representation of a system representing a second embodiment of the dynamic display of the present invention; and FIGURE 3 is a schematic representation of a system representing a third embodiment of the invention.

The representation of FIGURE 1 shows a cell 10 which may be constructed in accordance with the teachings of the copending application mentioned above.

The cell 10 includes a transparent substrate 12 through which the image may be viewed. A transparent metal electrode 14 is formed on the substrate 12 as a film, for example, in accordance with known techniques. A layer of a suitable electro-luminescent material, designated 16, is formed on the electrode 14; and a second layer of a suitable phosphorescent material, designated 18 is formed on the layer 16.

As noted above, the layer 18 may be a phosphorescent material. A second transparent conductor 20 is formed over the layer 18. In this manner, the layers 16 and 18 are sandwiched between the electrodes 14 and 20, and the layers are electrically connected in series between the two electrodes. A suitable source 22 of alternating current exciting potential is introduced across the electrodes 14 and 20.

As fully explained in the above-mentioned copending application, when an ultraviolet radiation is directed through the electrode 20 onto the layer 18, for example, and when the layer 18 is composed of a suitable phosphorescent material, the entire layer is excited to luminescence by the ultraviolet radiation. The resulting excitation of the layer 18 produces a corresponding drop in its electrical impedance. This impedance drop causes the source 22 to introduce sufficient potential across the electro-luminescent layer 16, so that the latter layer also luminesces. As mentioned above, the luminescence of the phosphorescent layer 18 quickly decays. However, its reduced impedance decays at a much slower rate, so that the electro-luminescent layer 16 continues to luminesce long after the visual excitation of the phosphorescent layer 18 ceases.

In the system of FIGURE 1, an appropriate utlraviolet source 24 is provided, and this source projects ultraviolet radiations through an aperture 26, and through the transparent electrode 20 onto the phosphorescent layer 18. The aperture 26 may be a usual motion picture projector type of aperture, and a usual motion picture film 28 may be drawn through the aperture from a reel 30 to a reel 32, and by a usual film drive mechanism 34.

The film 28 is drawn through the aperture 26 in a usual intermittent manner, so that the frames of the film may be successively aligned with the transparent electrode 20. The ultraviolet source 24 is energized intermittently, and this source is caused to be energized when each successive frame of the film 28 is arrested in the aperture 26 across the transparent electrode 20.

Therefore, for each frame, the energization of the ultraviolet source 24 causes a radiation image to be incident on the phosphorescent layer 18, so that the phosphorescent layer 18 is caused to luminesce and reproduce the image of the particular film frame. Also, and by the action described above, the point-by-point drop in impedance across the layer 18, as a result of the excitation by the ultraviolet radiation, causes the electro-luminescent layer 16 to be excited by the source 22 is a manner such that it displays the same image.

The ultraviolet source 24, and an infrared radiation source 36 may be energized from an appropriate voltage source 38. An electronic switch 40 is interposed between the radiation sources 24, 36 and the voltage source 38. This electronic switch 40 is, in turn, controlled by an appropriate electric control 42. The control of the electronic switch 40 is such that each time a film frame is set in position in the aperture 26, the ultraviolet source 24 is energized. However, during the intervals in which the film 28 is moved to withdraw a particular film frame and replace it by the next succeeding film frame, the electronic switch 40 causes the infrared source 36 to be energized so as to deactivate the phosphorescent layer 18.

The various sources, mechanisms and electrical controls shown in block form are well known in themselves to the art. Therefore, it is believed that a detailed description of these individual components, circuits and components is unnecessary herein.

It will be appreciated, that images of the successive film frames of the film 28 are reproduced on the electro-luminescent layer 16, and these images may be viewed through the substrate 12. Due to the intermittent excitation of the layer 18 and its subsequent quenching, the successive film frame images of the film 28 appear as dynamic images, when viewed through the substrate 12.

If at any time, it is desired to examine any particular film frame, it is merely necessary to excite the ultraviolet source 24 when that film frame is in place in the aperture 26, and to cut off the infrared source 36 and, subsequently, to cut off the ultraviolet source 24. As mentioned above, the resulting visible image in the phosphorescent layer 28 will quickly decay. However, the electrical characteristics produced in the layer 18 will decay at a much slower rate. This permits the image of the incident radiation image to be displayed for relatively long intervals of time in the electro-luminescent layer 16.

In the dynamic display system of FIGURE 2 the display cell 10 is used in conjunction with a flying spot scanner 100, rather than the motion picture film 28 shown in the system of FIGURE 1.

The system of FIGURE 2 includes a television receiver 102 which is coupled to a usual antenna 104. The field sweep system of the television receiver is designated by the block 106, and the line sweep system of the receiver is designated by the block 108. The sweep systems 106 and 108 are connected to the corresponding field and line deflection coils of the flying spot scanner 100. The detected output of the television receiver 102 is used to modulate the beam of the flying spot scanner.

During the receipt of a typical standard television signal, the flying spot scanner 100 is caused to scan its spot across the cell 10. During such scanning, the intensity of the spot is modulated by the received television signal, so that a television image is produced across the cell. This radiation image from the flying spot scanner excites the phosphorescent layer 18, as before, and the resulting change in the electrical characteristics causes the electro-luminescent layer 16 to display the image. The resulting image may be viewed through the transparent substrate 12, as in the previous embodiment.

An infrared source 110 is coupled to the field sweep system 106, and this source is energized during field retrace intervals, by the usual retrace signal developed by the system 106. The energization of the infrared source 110 quenches the phosphorescent layer 18, as in the previous embodiment. This permits a new image to be displayed by the cell 10 for each successive field of the received television signal, as is usual in the normal reproduction of received television signals.

Therefore, the dynamic television image represented by the received signal can be viewed through the substrate 12. As in the previous embodiment, the displayed image can be stopped at any time and examined in a static manner. This is achieved, for example, by cutting off the flying spot scanner at the end of any particular field, and at that time, assuring that the infrared source 110 is not energized. Then, the image represented by the preceding field is stored in the cell 10 in the manner described above, and may be viewed through the substrate 12.

The system of FIGURE 3 is generally similar to the system of FIGURE 2, and like components have been designated by the same numerals.

The system of FIGURE 3 also includes a television receiver 102 which is coupled to a usual antenna 104. However, in the embodiment of FIGURE 3, the flying spot scanner 100 is replaced by a cathode-ray tube 200.

The cathode-ray tube 200 may be the usual picture tube of a television receiver. In accordance with the concepts of the invention, the electro-luminescent panel described above is mounted directly over the phosphorescent screen 202 of the cathode-ray tube 200. If desired, the panel can be mounted on the external transparent face plate of the usual cathode-ray tube.

During the receipt of the television signal, the electron beam in the cathode-ray tube 200 is caused to scan across the phosphorescent screen 202. As is well-known, during such scanning, the intensity of the electron beam is modulated by the received television signal, so that the image is reproduced on the phosphorescent screen 202.

The resulting image in the screen 202 excites the phosphorescent layer 18 of the cell 10, and the resulting change in the electrical characteristics of that layer causes the electroluminescent layer 16 to display the image. The resulting image may be viewed through the transparent substrate 12, as before.

The infrared source 110 is positioned so that its radiations may extend through the tube 200 to quench the layers 202 and 18. As before, this source may be energized during the field retrace intervals of the received signal. The energization of the infrared source 110 quenches the phosphorescent layers, so as to permit a new image to be displayed by the cell 10 for each successive field of the received television signal.

Therefore, the dynamic television image can be viewed through the substrate 12. At any time, the movement of the image can be stopped and the resulting static image examined. This is achieved, for example, by blanking the electron beam in the tube 200, and maintaining the infrared source de-energized. Then, the image represented by the preceding field is stored in the cell 10, as described.

It will be appreciated that the systems of FIGURES 2 and 3 in which the cell 10 is shown as associated with scanning tubes which, in turn, are included in a television system, has broader application. That is, the cathode-ray tube 200, or the flying spot scanner 100, may be included in a wide variety of systems and circuits, such as test circuits, oscillograph circuits, and the like.

Moreover, the tubes 100 and 200 may be included in a wide variety of read-out circuits. When so incorporated, the resulting displays may be viewed on a dynamic basis until particular information, requiring further study, is displayed. At that time, the displays may be made static, so that the desired study may be carried out.

It is to be understood that the phosphorescent material described herein to illustrate the principal and modification embodiments of this invention contemplates using a phosphor which can be excited by ultra violet and quenched by infrared. It is to be understood that various phosphors may be selected such as a phosphor which can be excited by blue or green and can be quenched by infrared without departing from the spirit of this invention and it is also to be understood that even other phosphor which might be excited by different colors and quenched by radiation other than infrared may also be resorted to without departing from the spirit of this invention.

The invention provides, therefore, an improved display system which is capable of responding to radiation images. The systems of the present invention are particularly advantageous in that they are capable of reproducing dynamic radiation images, and of providing static displays of such images, when such are desired.

While particular embodiments of the invention have been shown and described, modifications may be made, and it is intended in the following claims to cover all such modifications which fall within the spirit and scope of the invention.

What is claimed is:

1. A dynamic display system including: a display cell including electro-luminescent material which luminesces when subjected to an electric field, phosphorescent material having an electric impedance which varies in accordance with the incident radiation connected in series with said electro-luminescent material, and means for introducing an electric field across said electro-luminescent material and said phosphorescent material to excite said electro-luminescent material to luminesce at an intensity determined by the electric impedance of said phosphorescent material; means for causing a succession of dynamic radiation images to be incident upon said phosphorescent material to excite the same and produce variations in the electrical impedance thereof from a particular value; and means for returning the electrical impedance of said phosphorescent material to said particular value between successive ones of said radiation images.

2. A dynamic display system including: a display cell including a first layer of electro-luminescent material which luminesces when subjected to an electric field, a second layer of phosphorescent material positioned adjacent said first layer and electrically coupled in series therewith, said phosphorescent material exhibiting an electric impedance which varies in accordance with the incidence of selected radiations thereon, and means including first and second electrodes sandwiching said first and second layers for applying an electric field across said layers to excite said electro-luminescent material of said first layer to glow with an intensity determined by the impedance of said phosphorescent material of said second layer; means for causing a succession of dynamic radiation images to be incident upon said second layer to excite said phosphorescent material and produce variations in the electrical impedance thereof from a particular value; and means for quenching said second layer between successive ones of said radiation images to return the electrical impedance of said phosphorescent material to said particular value.

3. The display system defined in claim 2 in which said second layer is composed of a phosphorescent material and in which said radiation image is in the ultra-violet range of the radiation spectrum, and in which said quenching means includes a source of radiation in the infrared range of the spectrum.

4. The display system of claim 2 in which said radiation images are produced by successive frames of a film strip.

5. The display system defined in claim 2 in which said radiation images are produced by the scanning action of a flying spot scanner.

6. A dynamic display system including: a display cell including a first layer of electro-luminescent material which luminesces when subjected to an electric field, a second layer of phosphorescent material positioned adjacent said first layer and electrically coupled in series therewith, the electrical impedance of said phosphorescent material varying in accordance with selected radiations incident thereon, and means including first and second electrodes sandwiching said first and second layers for applying an electric field across said layers to excite said electro-luminescent material of said first layer to luminesce with an intensity determined by the impedance of said phosphorescent material of said second layer; cathode-ray tube means including a luminescent screen positioned adjacent said first electrode for causing a succession of dynamic radiation images to be incident upon said second layer so as to excite said phosphorescent material and produce variations in the electrical impedance thereof from a particular value; and means for quenching said second layer between successive ones of said radiation images to return the electrical impedance of said phosphorescent material to said particular value.

7. A dynamic display system including: a display cell including a first layer of electro-luminescent material which luminesces when subjected to an electric field, a second layer of phosphorescent material positioned adjacent said first layer and electrically connected in series therewith, said phosphorescent material exhibiting an electrical impedance which varies in accordance with the incidence of selected radiations thereon and which exhibits a particular decay time upon the removal of such radiations, and means including first and second electrodes sandwiching said first and second layers for applying an electric field across said layers to excite said electro-luminescent material of said first layer to luminesce with an intensity determined by the impedance of said dielectric material of said second layer; means for causing a succession of dynamic radiation images to be incident upon said second layer to excite said phosphorescent material and produce variations in the electrical impedance thereof from a particular value; and means for quenching said second layer between successive ones of said radiation images to return the electrical impedance of said phosphorescent material to said particular value.

8. A dynamic display system including: motion picture projecting means including an aperture; a display cell including a first layer of electro-luminescent material which luminesces when subjected to an electric field, a second layer of phosphorescent material positioned adjacent said first layer and electrically connected in series therewith, said second layer being interposed between said first layer and said aperture and exhibiting an electrical impedance which varies in accordance with the incidence of selected radiations thereon, and means including first and second electrodes sandwiching said first and second layers for applying an electric field across said layers to excite said electro-luminescent material of said first layer to luminesce with an intensity determined by the impedance of said phosphorescent material of said second layer; said motion picture projection means causing a succession of dynamic radiation images to be incident upon said second layer to excite said phosphorescent material and produce variations in the electrical impedance thereof from a particular value; and means for quenching said second layer between successive ones of said radiation images to return the electrical impedance of said dielectric material to said particular value.

9. A dynamic display system including: a cathode-ray tube having a fluorescent display screen; a display cell mounted on said tube and including a first layer of electro-luminescent material which luminesces when subjected to an electric field, a second layer of phosphorescent material positioned between the viewing screen of said cathode-ray tube and said first layer, and electrically coupled to said first layer in series therewith, said phosphorescent material of said second layer exhibiting an electrical impedance which varies in accordance with the incidence of selected radiations thereon, and means including first and second electrodes sandwiching said first and second layers for applying an electric field across said layers to excite said electro-luminescent material of said first layer to luminesce with an intensity determined by the impedance of said phosphorescent material of said second layer; said cathode-ray tube causing a succession of dynamic images to be incident on said second layer from said fluorescent screen thereof so as to excite said phosphorescent material and produce variations in the electrical impedance thereof from a particular value; and means for quenching said second layer between successive ones of said images to return the electrical impedance of said first layer to said particular value.

10. The dynamic display system of claim 9 in which said quenching means includes a source of infrared energy.

References Cited by the Examiner
FOREIGN PATENTS
214,089    3/1957    Australia.

DAVID G. REDINBAUGH, *Primary Examiner.*

R. L. RICHARDSON, *Assistant Examiner.*